(12) United States Patent
Morandin

(10) Patent No.: US 7,656,800 B2
(45) Date of Patent: Feb. 2, 2010

(54) TRANSMISSION CONTROL PROTOCOL (TCP)

(75) Inventor: Guglielmo M. Morandin, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 743 days.

(21) Appl. No.: 10/949,679

(22) Filed: Sep. 24, 2004

(65) Prior Publication Data

US 2006/0023634 A1 Feb. 2, 2006

Related U.S. Application Data

(60) Provisional application No. 60/592,659, filed on Jul. 30, 2004.

(51) Int. Cl.
*H04J 1/16* (2006.01)
(52) U.S. Cl. ............ 370/235; 370/234; 370/231; 370/229; 709/235; 709/232; 709/233
(58) Field of Classification Search ......... 370/230, 370/232–235, 395.52, 229, 231; 709/230, 709/231, 232, 233, 234
See application file for complete search history.

(56) References Cited

U.S. PATENT DOCUMENTS

| | | | | |
|---|---|---|---|---|
| 5,675,742 A | * | 10/1997 | Jain et al. ............. | 709/226 |
| 6,493,316 B1 | * | 12/2002 | Chapman et al. ......... | 370/231 |
| 6,757,245 B1 | * | 6/2004 | Kuusinen et al. ......... | 370/230 |
| 6,934,251 B2 | * | 8/2005 | Ono ..................... | 370/229 |
| 7,046,631 B1 | * | 5/2006 | Giroux et al. ........... | 370/234 |
| 7,099,273 B2 | * | 8/2006 | Ha et al. ............... | 370/229 |
| 7,130,268 B2 | * | 10/2006 | Mascolo ................. | 370/232 |
| 2001/0032269 A1 | * | 10/2001 | Wilson .................. | 709/235 |
| 2003/0214908 A1 | * | 11/2003 | Kumar et al. ............ | 370/234 |
| 2005/0141419 A1 | * | 6/2005 | Bergamasco et al. ...... | 370/230 |
| 2005/0226150 A1 | * | 10/2005 | Santos et al. ........... | 370/230 |
| 2006/0268708 A1 | * | 11/2006 | Speight et al. .......... | 370/235 |

OTHER PUBLICATIONS

Bernard Cole, "Decentralized data center, faces reliability problems", EETimes.com, May 20, 2002.

\* cited by examiner

*Primary Examiner*—Jason E Mattis
*Assistant Examiner*—Dady Chery
(74) *Attorney, Agent, or Firm*—Weaver Austin Villeneuve & Sampson LLP

(57) ABSTRACT

According to the present invention, methods and apparatus are provided to improve the Transmission Control Protocol (TCP) for data such as delay sensitive or bursty data. A maximum send window and a minimum send window are set to correspond to maximum and minimum bandwidth parameters associated with a network. Round trip times are monitored to adjust maximum send windows and minimum send windows. A variable rate shaper is also used to pace packet introduction onto the network.

32 Claims, 6 Drawing Sheets

TRANSMISSION CONTROL PROTOCOL (TCP)

CROSS REFERENCE TO RELATED APPLICATIONS

This application claims benefit of priority under 35 U.S.C. 119(e) of (i) U.S. Provisional Application No. 60/592,659 filed Jul. 30, 2004 and titled "TRANSMISSION CONTROL PROTOCOL (TCP)", the entirety of which is incorporated by reference for all purposes.

BACKGROUND OF THE INVENTION

1. Field of the Invention

The present invention generally relates to the Transmission Control Protocol (TCP). More specifically, the present invention provides techniques and mechanisms for improving TCP, particularly for transmitting data such as storage application data.

2. Description of Related Art

TCP provides reliability, network adaptability, and flow control. Reliability is generally provided by using mechanisms such as sequence numbers to enable retransmission. Network adaptability and flow control are generally provided by using mechanisms such as windows. A window limits the amount of data not yet acknowledged that can be transmitted onto a network.

Conventional TCP congestion control mechanisms work well for many types of data transmissions. However, conventional TCP congestion control mechanisms often do not work adequately for delay sensitive or bursty data, such as data associated with an Internet Protocol (IP) Storage Application. In one example, TCP does not work adequately for transferring data associated with Storage Area Networks (SANs).

Consequently, it is desirable to provide techniques for improving TCP to allow more effective and efficient transmission of data such as delay sensitive and bursty data.

SUMMARY OF THE INVENTION

According to the present invention, methods and apparatus are provided to improve the Transmission Control Protocol (TCP) for data such as delay sensitive or bursty data. A maximum send window and a minimum send window are set to correspond to maximum and minimum bandwidth parameters associated with a network. Round trip times are monitored to adjust maximum send windows and minimum send windows. A variable rate shaper is used to pace packet introduction onto the network. Compression rates are also computed to adjust window sizes.

In one embodiment, a method performing congestion control using a transmission control protocol (TCP) is provided. A round trip time associated with sending data associated with a channel from a source node is measured and an acknowledgment from a destination node using the transmission control protocol (TCP) is received. A maximum window or a minimum window is adjusted based on the measured round trip time. The minimum window is calculated using the minimum bandwidth allocated to the channel.

In another embodiment, a method for performing congestion control using a transmission control protocol (TCP) is provided. Data associated with a channel is transmitted from a source node to a destination node in a network. It is determined if an acknowledgment corresponding to the data has been received from the destination node. The size of a congestion window is adjusted based on the determination if the acknowledgment has been received. The congestion window is bound in size by a minimum window and a maximum window configured based on minimum and maximum bandwidth parameters associated with the channel.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Figure 1:
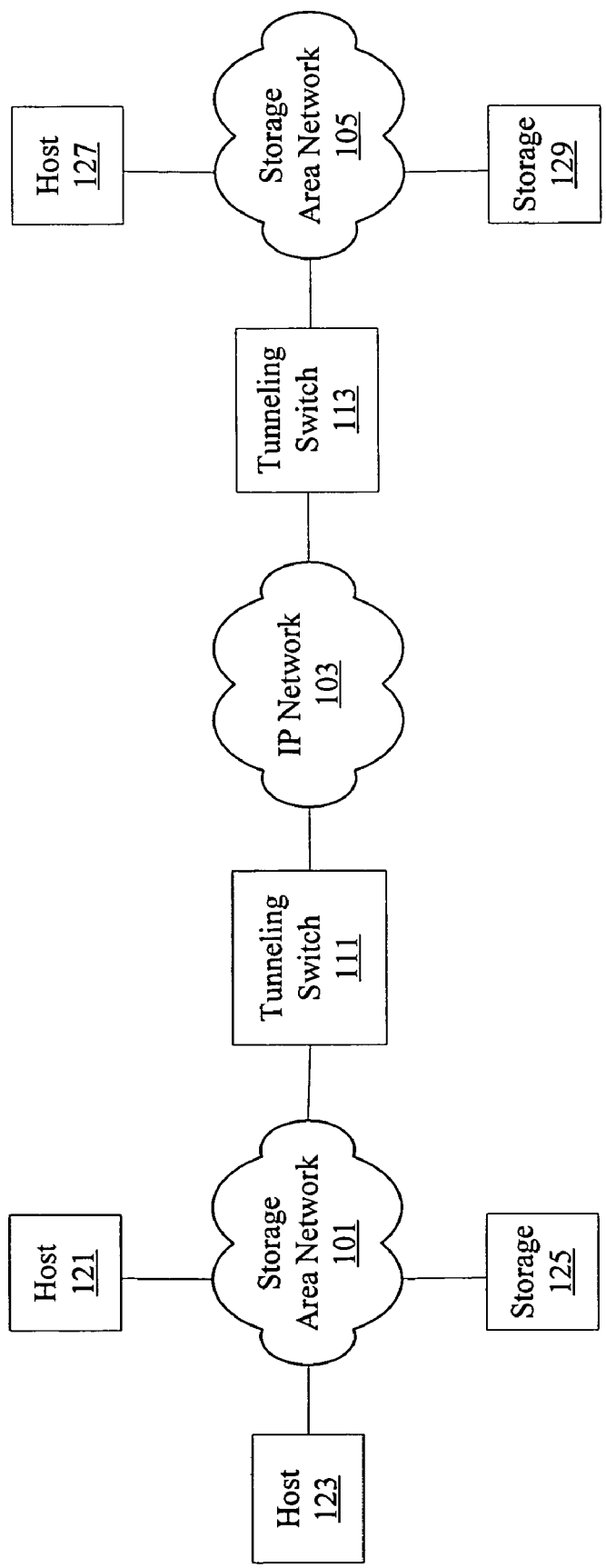
FIG. 1 is a diagrammatic representation showing network nodes that can use the techniques of the present invention.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of the transmission control protocol (TCP) fibre channel networks. However, it should be noted that the techniques of the present invention can be applied to different variations and flavors of TCP. In the following description, numerous specific details are set forth in order to provide a thorough understanding of the present invention. The present invention may be practiced without some or all of these specific details. In other instances, well known process operations have not been described in detail in order not to unnecessarily obscure the present invention. Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

The transmission control protocol (TCP) is a transport layer protocol that provides full-duplex, stream-oriented, connections allowing for reliable transmissions, network adaptation, and flow control. TCP provides transmission of streams of bytes in full-duplex. Traffic flows in both the forward and reverse directions. Only during connection start and close sequences can TCP exhibit asymmetric behavior. Data transmissions are organized into different connections.

Reliability is provided using sequences numbers to track what data has been transmitted and received for each particular connection. TCP arranges for retransmission if it determines that data has been lost. TCP learns about delay characteristics associated with a network and attempts to adjust its operation to maximize throughput. Fast senders are periodically stopped to limit network data buffer overflow. TCP typically uses 32-bit sequence numbers that count bytes in the data stream. Each TCP packet includes the starting sequence number of the data in that packet, and the sequence number (also referred to as an acknowledgment number) of the last byte received from the remote peer. Forward and reverse sequence numbers are independent, and each TCP peer tracks both its own sequence numbering and the numbering being used by the remote peer. TCP also uses a number of flags to manage connections.

TCP provides adaptability and flow control by using windows. To avoid overflowing various network buffers, TCP attempts to manage the amount of data transmitted onto a network. In typical instances, a window limits the amount of data not yet acknowledged that can be transmitted onto a network. When the window is full of data transmitted by not yet acknowledged, no other data can be sent. When an acknowledgment is received, additional data can be sent. If no acknowledgment is received after a predetermined time out period, the packet is assumed to have been lost and the data is retransmitted.

In some instances, TCP varies the size of the window based on whether or not an acknowledgment is received. Any window that is varied in size based on transmission characteristics is referred to herein as a congestion window. In one example, a congestion window grows by one segment every time an acknowledgment is received. Consequently, the sender not only can send new data based on the acknowledgment being received but can also send new data based on the increased window size. However, the scheme is often too aggressive as the growing window size will eventually cause too much data to be transmitted onto the network and lead to packet drops. Similarly, the congestion window typically shrinks to a single segment every time the sender is idle for more than a retransmission timeout.

The congestion window then gradually grows based on successful transmissions. The congestion window grows linearly if the TCP Congestion Avoidance scheme is being used and the congestion window grows exponentially if the TCP Slow Start scheme is being used. Congestion Avoidance and Slow Start are described in RFC 2001. However, the growth of the congestion window is slow, particularly because the congestion window shrinks to a very small size. Consequently, neither Congestion Avoidance nor Slow Start are effective for bursty data such as data from storage applications in storage area networks. The conservative growth of the congestion window may also not be suitable for delay sensitive data such as real-time video data.

Furthermore, TCP typically performs no traffic shaping of any sort. As a congestion window is growing in size, bursty traffic can be transmitted suddenly onto a network without regard to any traffic shaping parameters. Consequently, bursty traffic can end up flooding network queues and at the minimum creating unnecessary delay and risking buffer overflow.

According to various embodiments of the present invention, a minimum bandwidth and maximum bandwidth are configured for a TCP connection. The maximum bandwidth is the highest transmission rate available for a particular connection. The minimum bandwidth is a minimum transmission rate provided for the connection. A maximum window is set based on the amount of data a network is expected to handle for the connection based on the bandwidth and the propagation delay. A few other factors such as jitter and header sizes can be accounted for to make the window size calculation even more accurate.

Calculating a window size accurately avoids buildup of queues in the network while maintaining the average send rate equal to the slowest link in the network. The minimum round-trip time is measured over a period of time and is used as an estimate of the propagation delay. Every round-trip is accurately measured using a high precision clock. If the round-trip time changes, window sizes can be adjusted accordingly. Similarly, a minimum window is set based on the guaranteed bandwidth and the propagation delay. According to various embodiments, a congestion window or a target offered window is configured to fall within the range set by the maximum window and the minimum window. Consequently, the congestion window does not necessarily fall to a single segment when a packet drop is detected.

The techniques of the present invention recognize that traditional TCP overreacts to drops by completely collapsing the window when the bandwidth times delay product is large. The techniques of the present invention allow for a more measured reduction in window size. According to various embodiments, the congestion window is not decreased in size below the size of a minimum window associated with a minimum bandwidth provided by the network. Variables such as a Slow Start Threshold can also be manipulated to allow exponential growth of the congestion window using Slow Start versus the more linear growth of the congestion window using Congestion Avoidance.

Furthermore, a variable-rate shaper is used to pace packet introduction onto the network to avoid bursts, such as bursts associated with data from a disk array. The rate depends on the amount of outstanding data. If the amount of outstanding data in the network is less than the calculated minimum window, the traffic is shaped at the minimum bandwidth. Otherwise, the traffic is shaped that maximum bandwidth. Shaping smoothes the bursts that are characteristic of Slow Start in a traditional TCP implementation. It is recognized that traffic can also be shaped at rates other than the minimum bandwidth and the maximum bandwidth.

Average receive and transmit compression rates are also computed periodically. The transmit compression rate can be used to increase the size of a send window, in order to use the opportunity to fit more unacknowledged bytes in a pipe to keep it full. A receive compression rate can be used to increase the target offered window, so that the remote end will not be flow controlled. This allows a more accurate determination of compressions factors over statistical estimation techniques. The techniques of the present invention increase overall performance by reducing the probability of drops and increasing overall bandwidth usage.

FIG. 1 is a diagrammatic representation showing a network topology that can use the techniques of the present invention. A storage area network 101 includes hosts 121 and 123 along with storage node 125. Storage node 125 may include a disk or tape array. The storage area network 101 can also include multiple fibre channel switches. The storage area network 101 is coupled to an IP network 103 through a tunneling switch 111. Storage area network 105 includes host 127, storage 129, as well as other fibre channel switches and tunneling switch 113. The tunneling switches 111 and 113 allow the formation of a tunnel to transmit storage network data over an IP network 103.

According to various embodiments, improvements to TCP can be implemented at any source originating traffic or at any destination receiving traffic. For example, improvements to TCP can be implemented at hosts in a storage area network. In another example, improvements to TCP can be implemented at tunneling switches connecting storage area networks to an IP network. The techniques can be implemented anywhere TCP is implemented. TCP typically allows the transmission of data using windows.

Figure 2:
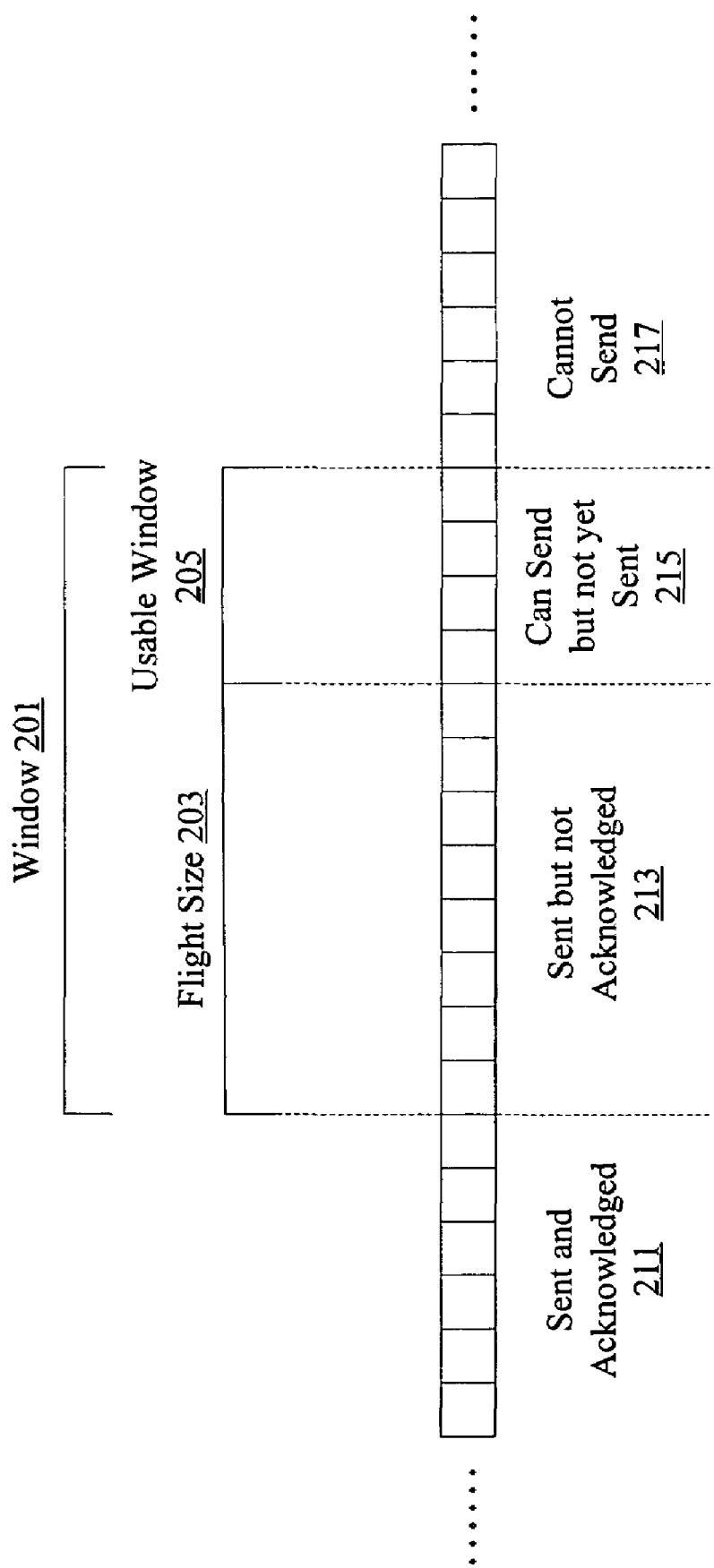
FIG. 2 is a diagrammatic representation showing a TCP transmission stream.

FIG. 2 is a diagrammatic representation showing a window. A data stream is separated into different parts. Portion 211 is data that has been sent and acknowledged. Portion 213 is data has been sent but not yet acknowledged. In some examples, this portion 213 includes data that has been retransmitted one or more times. This part is often referred to as the flight size 203. Another part of the data stream and is referred to as the usable window 205. The usable window is the portion 215 that can be sent but has not yet been sent over the network.

In some examples, the usable window has a non-zero size when space is available in window 201. When the usable window 205 diminishes to nearly 0 and the flight size 203 encompasses nearly all of window 201, no additional data can be sent. The flight size 203 and the usable window 205 together are referred to as a window 201, transmission window, or congestion window. The data stream can also include data 217 that can not yet be sent over the network.

Figure 3:
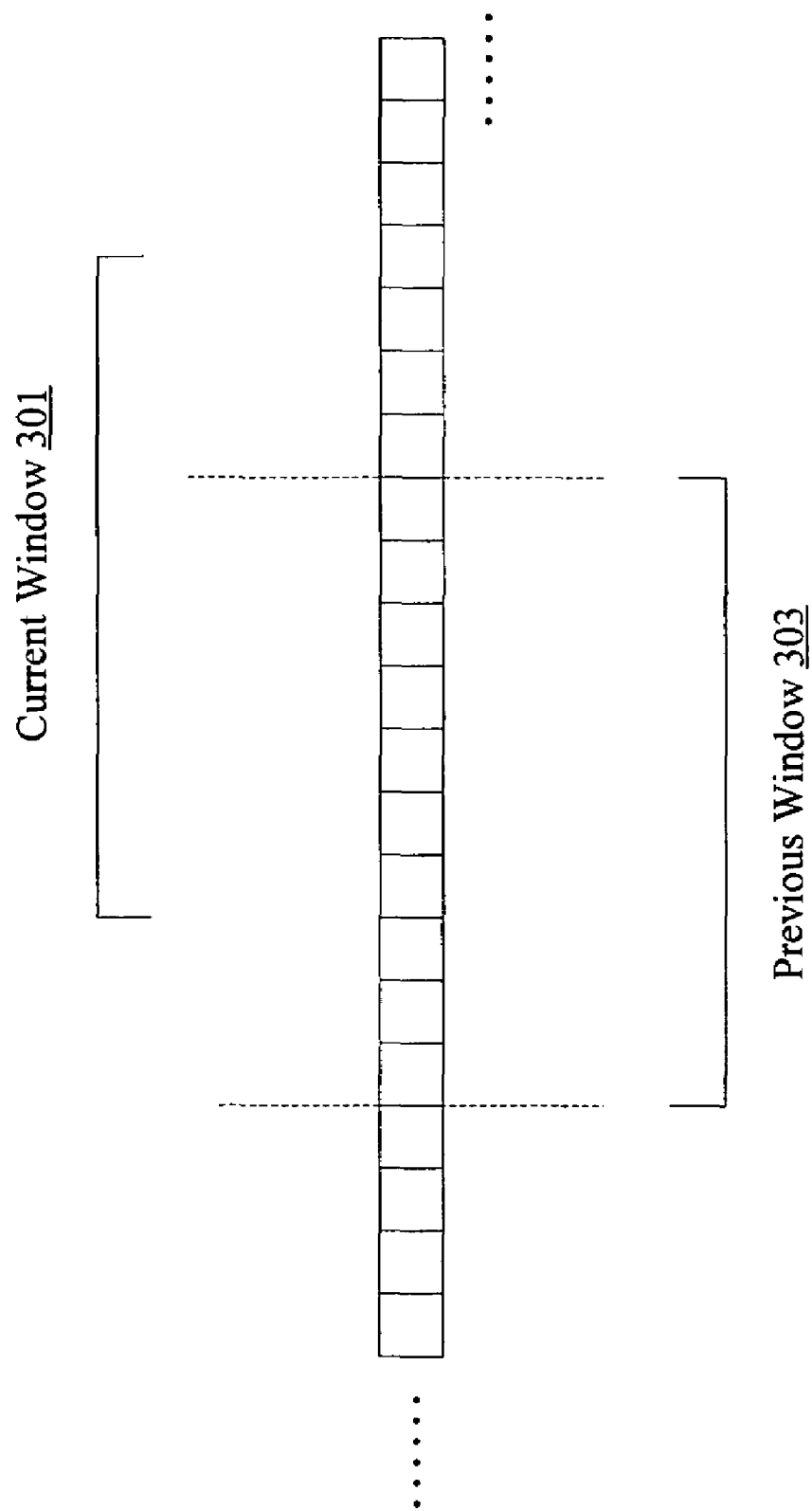
FIG. 3 is a diagrammatic representation showing a TCP sliding window.

FIG. 3 is a diagrammatic representation showing a sliding window. As data is acknowledged, a previous window 303 slides over to a current window 301 position. As data is transmitted and acknowledged, the current window continues to move to incorporate more data that has not been sent. For example, an acknowledgment may be sent for every 2 packets received by a destination. Each acknowledgment detected can shift the current window 301 over a predetermined amount. The window typically slides by the amount of data that has been acknowledged. The window typically changes size based on slow start and congestion control mechanisms.

According to various embodiments, the techniques of the present invention recognize that sending an acknowledgment for every 2 packet received may not be efficient. Consequently, the techniques of the present invention can vary the amount of acknowledgments sent depending on the burstiness of the traffic. In some instances, an acknowledgment is sent for every 10 packets received. By sending fewer acknowledgments, less packets need to be processed by the endpoints. In some instances, window sizes also change as acknowledgments or lack of acknowledgments are detected.

According to various embodiments, the techniques of the present invention count the number of bytes and not the number of packets acknowledged. This effectively modulates the number of acknowledgments per packet based on packet size: if small packets are used, proportionally less acknowledgments are returned. The techniques of the present invention also open the window during slow start and congestion avoidance based on amount of bytes acknowledged, not packets. In some examples, it does not matter how many acknowledgments the peer is returning per packet: during congestion avoidance over one round trip. The congestion window is increased by one mss. During slow start the congestion window grows by 50% over one round trip. Standard TCP window growth is affected by the amount of acknowledgments per packet returned by the peer.

Furthermore, if packets have not been received recently, an acknowledgment is sent for every packet for a certain number of packets. Then acknowledgments are sent each time an increasing number of bytes is received. In one example, this growth is exponential up to 4096 bytes. In typical instances, acknowledgments are sent every 2 or 3 packets.

Sending an acknowledgment after every packet accelerates slow start when the peer is a standard TCP peer. A standard TCP peer would perform delayed acknowledgments and wait 200 ms before sending an acknowledgment, greatly slowing down window opening for the first couple of round trips.

Figure 4:
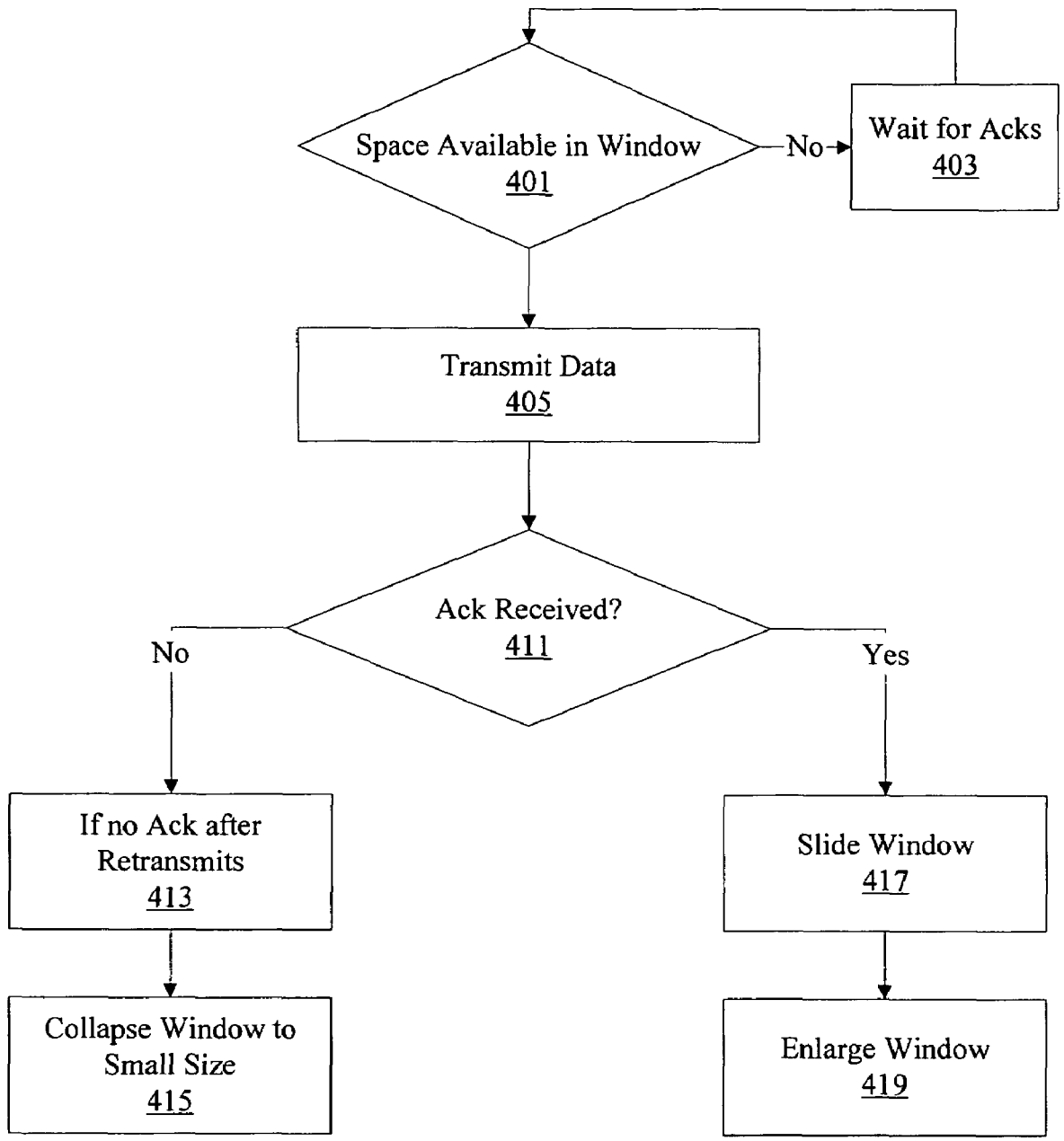
FIG. 4 is a flow process diagram showing one technique for updating a window.

FIG. 4 is a simplified flow process diagram showing a technique for adjusting a congestion window. It should be noted that the flow processes depicted herein are merely examples of techniques of the present invention. A variety of other techniques can also be applied. Some of the processes depicted are optional while other processes may be added while remaining within the scope of the present invention. In some instances, details associated with the process operations may not be described in order not to unnecessarily obscure the present invention.

At 401, it is determined if space is available in a window. According to various embodiments, space is available if a window is not full of data sent but not yet acknowledged. If not space is available, the sender waits for acknowledgments corresponding to sent packets or for sent packet time outs. If space is available in a window, data is transmitted 405. In one example, data is continuously transmitted as long as space is available in a window. Various counters, timers, and sequence numbers can be maintained to allow for reliable retransmission. As data is transmitted, a decreasing amount of space is available in the window for transmission until acknowledgments are received.

If an acknowledgment is received at 411, the window now has more space to incorporate new data to be transmitted. In one example, if an acknowledgment is received at 411, the window slides to include new data for transmission at 417. In some instances, the window is enlarged by one segment. In many examples, the windows is also enlarged. However, if no acknowledgment is received after one or more retransmit attempts at 413, the window is collapsed to a very small size, often one or two segments at 415. This is often a very drastic remedy for addressing dropped packets. This is an effective solution for conventional protocols such as the file transfer protocol (FTP), which is more concerned about effectively transferring a file than it is with real-time handling of bursty data.

However, the techniques of the present invention recognize that the window need not be adjusted as drastically. The techniques of the present invention provide mechanisms for intelligently adjusting the window size, based on bandwidth requirements and availability for a particular network. According to various embodiments, a congestion window is adjusted every time TCP output is invoked. In one example, the congestion window is set using the following code:

```
Cwnd=min(cwnd, snd_nxt—snd_una+cwm);

Cwnd=max(cwnd, min_win);
```

That is, the congestion window is always at least the size of the minimum window. The congestion window is possibly decreased so the usable window is limited to a cwm amount. In some examples, cwm is configurable from 10k to 100k. After an idle or even partial idle period, the sender will either send all the data needed to have the minimum window bytes in the network while shaping at the minimum rate or shrink the congestion window and send only cwm bytes faster than the minimum rate if a minimum window is already in the network.

According to various embodiments, the minimum window is determined to be the minimum bandwidth multiplied by the propagation delay times the actual size of the payloads. This can be represented as follows:

min_window=minbandwidth*minRTT*(0.98);

The value 0.98 is one value that can be used to account for the size of packet payloads in relation to the total packet size. In this example, 2 percent of transmitted packets are assumed to be packet headers.

A maximum window is set to the size of maximum bandwidth multiplied by sum of the propagation delay plus jitter while also accounting for header sizes. A min window of 14 KB is also enforced. This can be represented as follows:

max_window=max(maxbandwidth*(minRTT+jitter)
*0.98, 14k);

A jitter factor is used to account for processing time at each network node that may be unaccounted for in transmission times. The determination of the jitter factor is often done empirically, as it depends on delay associated with pieces of network equipment.

Figure 5:
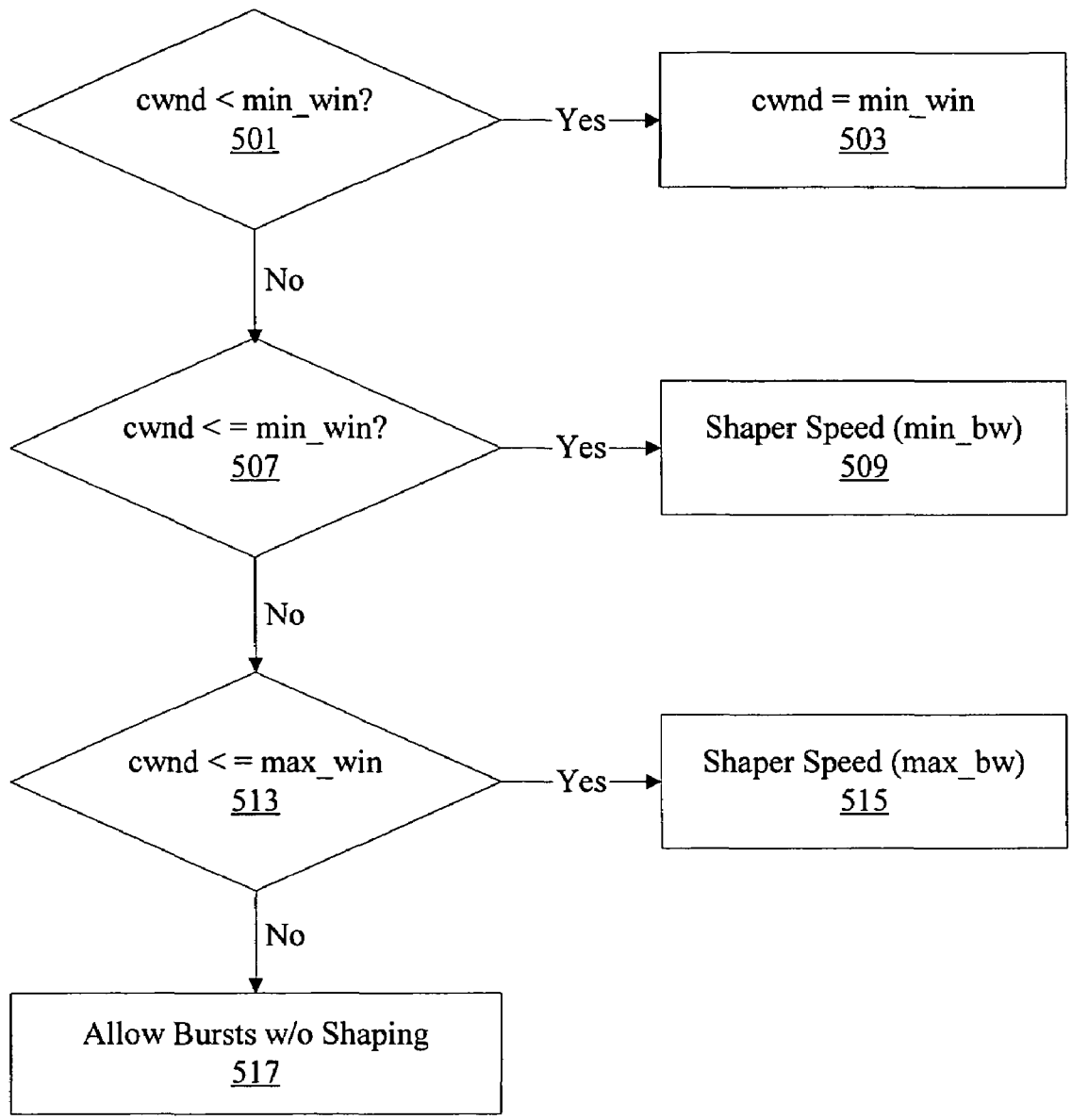
FIG. 5 is a flow process diagram showing one technique setting a congestion window and applying a shaper.

FIG. 5 is a flow process diagram showing one technique for shaping data. According to various embodiments, techniques of the present invention not only provide more efficient and effective ways for determining congestion window sizes but also provide a variable shaper to smooth bursts of data. At 501, if it is determined that a congestion window is less than a minimum window size, a congestion window is set to the size of the minimum window at 503. The minimum window size may be set based on the minimum bandwidth guaranteed or expected of a network for a particular channel.

If the congestion window is less than or equal to the minimum window size at 507, traffic is shaped using a minimum bandwidth 509. According to various embodiments, data is transmitted onto the network at the rate associated with the minimum bandwidth. If the congestion window is less than or equal to the maximum window at 513, traffic is shaped using the maximum bandwidth 515.

That is, data is transmitted onto the network at a rate associated with a maximum bandwidth. Otherwise, no traffic shaping is needed at 517. According to various embodiments, shaper speeds at rates other than the minimum bandwidth and the maximum bandwidth can be applied to further fine-tune traffic shaping. For example, traffic can be shaped at bandwidths intermediate between min and max based on the amount of outstanding network data. However, the techniques of the present invention recognize that traffic shaping can be expensive from a processing perspective. Consequently, having only to shape at two speeds can significantly improve performance. Furthermore, even if the congestion window is greater than the maximum window, a shaper speed associated with the maximum bandwidth can be applied to prevent bursts.

The techniques of the present invention can be implemented on a variety of devices such as hosts and switches. In some examples, the improvements to TCP can be implemented at any source originating traffic or destination receiving traffic. In other examples, the improvements to TCP can also be implemented at tunneling switches used to transmit storage application data over IP networks.

Figure 6:
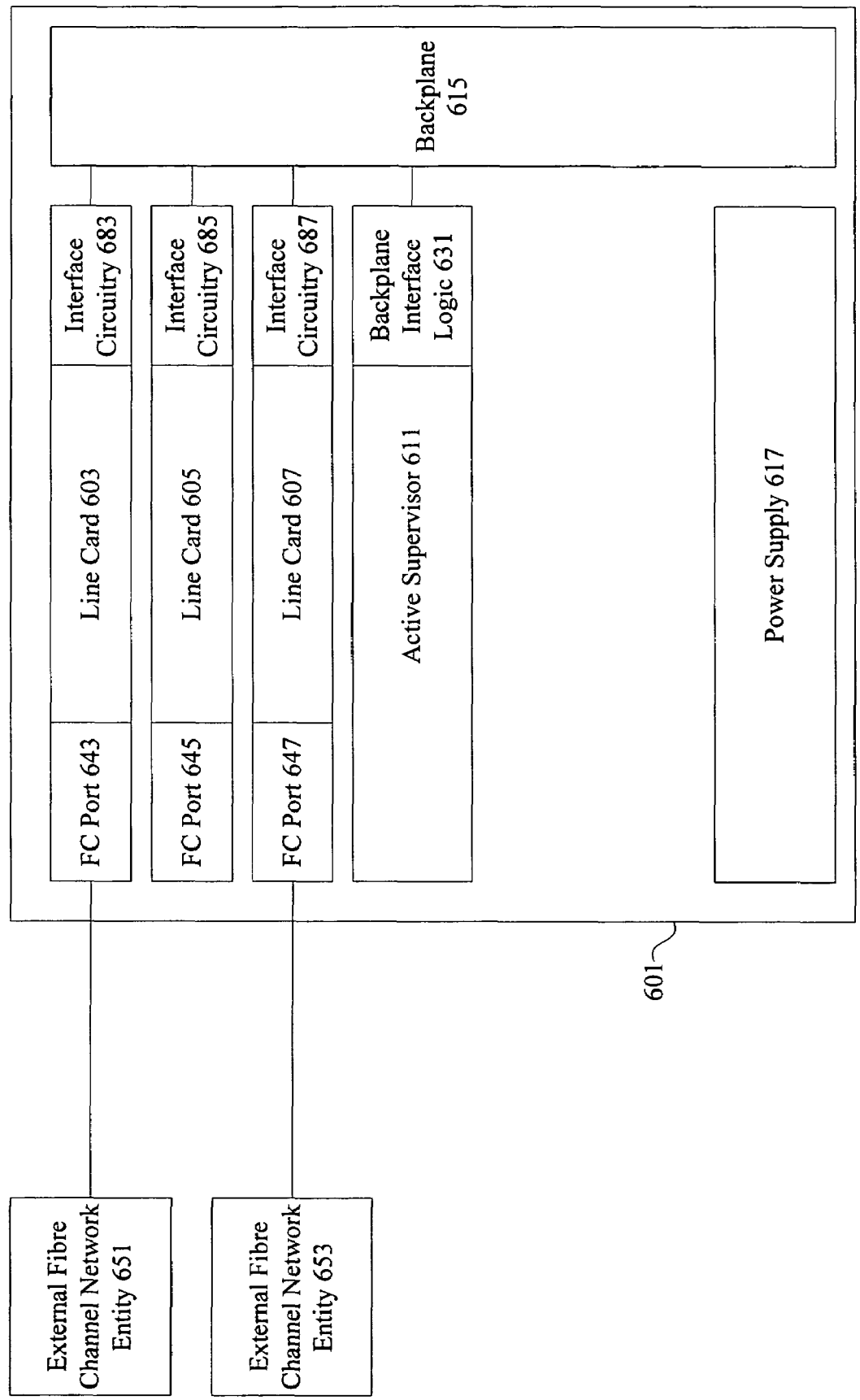
FIG. 6 is a diagrammatic representation of a device that can use the techniques of the present invention.

FIG. 6 is a diagrammatic representation of one example of a fibre channel switch that can be used to implement techniques of the present invention. Although one particular configuration will be described, it should be noted that a wide variety of switch configurations are available. The tunneling switch 601 may include one or more supervisors 611. According to various embodiments, the supervisor 611 has its own processor, memory, and storage resources.

Line cards 603, 605, and 607 can communicate with an active supervisor 611 through interface circuitry 683, 685, and 687 and the backplane 615. According to various embodiments, each line card includes a plurality of ports that can act as either input ports or output ports for communication with external fibre channel network entities 651 and 653. The backplane 615 can provide a communications channel for all traffic between line cards and supervisors. Individual line cards 603 and 607 can also be coupled to external fibre channel network entities 651 and 653 through fibre channel ports 643 and 647.

External fibre channel network entities 651 and 653 can be nodes such as other fibre channel switches, disks, RAIDS, tape libraries, or servers. It should be noted that the switch can support any number of line cards and supervisors. In the embodiment shown, only a single supervisor is connected to the backplane 615 and the single supervisor communicates with many different line cards. The active supervisor 611 may be configured or designed to run a plurality of applications such as routing, domain manager, system manager, and utility applications.

According to one embodiment, the routing application is configured to provide credits to a sender upon recognizing that a frame has been forwarded to a next hop. A utility application can be configured to track the number of buffers and the number of credits used. A domain manager application can be used to assign domains in the fibre channel storage area network. Various supervisor applications may also be configured to provide functionality such as flow control, credit management, and quality of service (QoS) functionality for various fibre channel protocol layers.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

What is claimed is:

1. A method performing congestion control using a transmission control protocol (TCP), the method comprising:
   measuring a round trip time associated with sending data associated with a channel from a source node and receiving an acknowledgment from a destination node using the transmission control protocol (TCP);
   adjusting a maximum window or a minimum window based on the measured round trip time, wherein the minimum window is calculated using a minimum bandwidth allocated to the channel;
   decreasing the size of a congestion window to a size greater than 1 segment upon detecting congestion, wherein the size of the congestion window is decreased to a size between the size of the minimum window and the maximum window, wherein the minimum window is calculated by multiplying the minimum bandwidth by a propagation delay by a payload size in proportion to a packet size.

2. The method of claim 1, wherein the minimum window is substantially equal to the round trip time multiplied by the minimum bandwidth allocated to the channel.

3. The method of claim 1, wherein the maximum window is calculated using the maximum bandwidth allocated to the channel.

4. The method of claim 2, wherein the maximum window is substantially equal to the round trip time multiplied by the maximum bandwidth allocated to the channel.

5. The method of claim 1, wherein a congestion window is decreased when data is dropped.

6. The method of claim 5, wherein if the congestion window is smaller than a minimum window, the congestion window is set to the size of the minimum window.

7. The method of claim 5, wherein if the congestion window can be set no larger than a maximum window.

8. The method of claim 5, wherein the congestion window defines the amount of data that can be transmitted onto a network but not yet acknowledged.

9. The method of claim 5, wherein a variable rate traffic shaper is used to pace packet introduction onto a network.

10. The method of claim 9, wherein traffic is shaped at a rate associated with the minimum bandwidth if the congestion window is substantially the same size as the minimum window.

11. The method of claim 9, wherein traffic is shaped at a rate associated with the maximum bandwidth if the congestion window is larger than the minimum window but smaller or substantially equal in size to the maximum window.

12. The method of claim 9, wherein traffic is not shaped if the congestion window is larger the than maximum window.

13. The method of claim 1, further comprising periodically computing average receive and transmit compression rates.

14. The method of claim 13, wherein the receive compression rate is used to inflate a target offered window.

15. The method of claim 13, wherein the transmit compression rate is used to inflate the congestion window.

16. A method performing congestion control using a transmission control protocol (TCP), the method comprising:
  transmitting data associated with a channel from a source node to a destination node in a network;
  determining if an acknowledgment corresponding to the data has been received from the destination node;
  adjusting the size of a congestion window upon determining if the acknowledgment has been received, wherein the congestion window is bound in size by a minimum window and a maximum window configured based on minimum and maximum bandwidth parameters associated with the channel, the minimum window calculated by multiplying a minimum bandwidth by a propagation delay by a payload size in proportion to a packet size, wherein the congestion window is adjusted to a size greater than 1 segment.

17. The method of claim 16, wherein the minimum window is substantially equal to the round trip time multiplied by the minimum bandwidth allocated to the channel.

18. The method of claim 16, wherein the maximum window is calculated using the maximum bandwidth allocated to the channel.

19. The method of claim 17, wherein the maximum window is substantially equal to the round trip time multiplied by the maximum bandwidth allocated to the channel.

20. The method of claim 16, wherein a congestion window is decreased when an acknowledgment is not detected.

21. The method of claim 16, wherein a variable rate shaper is used to pace packet introduction onto the network.

22. The method of claim 21, wherein traffic is shaped at a rate associated with the minimum bandwidth if the congestion window is substantially the same size as the minimum window.

23. The method of claim 21, wherein traffic is shaped at a rate associated with the maximum bandwidth if the congestion window is larger than the minimum window but smaller or substantially equal in size to the maximum window.

24. The method of claim 21, wherein traffic is not shaped if the congestion window is larger the than maximum window.

25. An apparatus using a transmission control protocol (TCP), the apparatus comprising:
  means for measuring a round trip time associated with sending data associated with a channel from a source node and receiving an acknowledgment from a destination node using the transmission control protocol (TCP);
  means for adjusting a maximum window or a minimum window based on the measured round trip time, wherein the minimum window is calculated using a minimum bandwidth allocated to the channel;
  means for decreasing the size of a congestion window to a size greater than 1 segment upon detecting congestion, wherein the size of the congestion window is decreased to a size between the size of the minimum window and the maximum window, wherein the minimum window is calculated by multiplying the minimum bandwidth by a propagation delay by a payload size in proportion to a packet size.

26. The apparatus of claim 25, wherein the minimum window is substantially equal to the round trip time multiplied by the minimum bandwidth allocated to the channel.

27. The apparatus of claim 25, wherein the maximum window is calculated using the maximum bandwidth allocated to the channel.

28. The apparatus of claim 26, wherein the maximum window is substantially equal to the round trip time multiplied by the maximum bandwidth allocated to the channel.

29. The apparatus of claim 25, wherein a congestion window is decreased when data is dropped.

30. A network, comprising:
  a destination node configured to receive data and send an acknowledgment corresponding to the data;
  a source node configured to transmit data associated with a channel and adjust the size of a congestion window upon determining if the acknowledgment has been received, wherein the congestion window is bound in size by a minimum window and a maximum window configured based on minimum and maximum bandwidth parameters associated with the channel, wherein the minimum window is calculated by multiplying a minimum bandwidth by a propagation delay by a payload size in proportion to a packet size, wherein the congestion window is adjusted to a size greater than 1 segment.

31. The network of claim 30, wherein the minimum window is substantially equal to the round trip time multiplied by the minimum bandwidth allocated to the channel.

32. The network of claim 30, wherein the maximum window is calculated using the maximum bandwidth allocated to the channel.

* * * * *

UNITED STATES PATENT AND TRADEMARK OFFICE
CERTIFICATE OF CORRECTION

PATENT NO. : 7,656,800 B2  Page 1 of 1
APPLICATION NO. : 10/949679
DATED : February 2, 2010
INVENTOR(S) : Guglielmo M. Morandin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1232 days.

Signed and Sealed this

Twenty-eighth Day of December, 2010

David J. Kappos
*Director of the United States Patent and Trademark Office*